(12) United States Patent
Emborg (10) Patent No.: US 8,218,529 B2
(45) Date of Patent: Jul. 10, 2012

(54) DEVICE FOR AND METHOD OF TERMINATING A VOIP CALL

(75) Inventor: Mads Emborg, Kanata (CA)

(73) Assignee: Avaya Canada Corp., Halifax (CA)

( * ) Notice: Subject to any disclaimer, the term of this patent is extended or adjusted under 35 U.S.C. 154(b) by 1768 days.

(21) Appl. No.: 11/456,120

(22) Filed: Jul. 7, 2006

(65) Prior Publication Data

US 2008/0037517 A1 Feb. 14, 2008

(51) Int. Cl.
*H04L 12/66* (2006.01)
*H04L 12/28* (2006.01)
*G10L 11/04* (2006.01)
*H04M 11/10* (2006.01)
*H04M 1/64* (2006.01)
*G06F 15/16* (2006.01)

(52) U.S. Cl. ..... 370/352; 704/206; 455/413; 370/395.2; 370/401; 379/88.1; 379/88.17; 379/88.22; 709/227; 709/247; 709/249

(58) Field of Classification Search ............... 370/395.2, 370/395.21, 352–356, 401; 455/413; 704/206–208; 709/227, 247, 249; 379/88.1, 88.17, 88.22
See application file for complete search history.

(56) References Cited

U.S. PATENT DOCUMENTS

| | | | |
|---|---|---|---|
| 6,373,842 B1 * | 4/2002 | Coverdale et al. | 370/394 |
| 6,505,216 B1 | 1/2003 | Schutzman et al. | 707/204 |
| 6,553,515 B1 * | 4/2003 | Gross et al. | 714/47 |
| 6,584,108 B1 | 6/2003 | Chung et al. | 370/401 |
| 7,359,979 B2 * | 4/2008 | Gentle et al. | 709/231 |
| 7,693,710 B2 * | 4/2010 | Jelinek et al. | 704/207 |
| 2003/0120726 A1 * | 6/2003 | Archibald et al. | 709/203 |
| 2003/0163702 A1 | 8/2003 | Vigue et al. | 713/176 |
| 2004/0002855 A1 * | 1/2004 | Jabri et al. | 704/219 |
| 2004/0267525 A1 * | 12/2004 | Lee et al. | 704/208 |
| 2005/0084094 A1 * | 4/2005 | Gass et al. | 379/416 |
| 2005/0094580 A1 * | 5/2005 | Kumar et al. | 370/260 |
| 2005/0171768 A1 * | 8/2005 | Gierach | 704/208 |
| 2006/0025114 A1 * | 2/2006 | Bales et al. | 455/413 |
| 2006/0133349 A1 * | 6/2006 | Kan et al. | 370/352 |

(Continued)

FOREIGN PATENT DOCUMENTS

EP 0993163 4/2000

(Continued)

*Primary Examiner* — Alpus H Hsu
*Assistant Examiner* — Joel Hamel
(74) *Attorney, Agent, or Firm* — Muncy, Geissler, Olds & Lowe, PLLC (57) ABSTRACT

The invention relates to the field of voice over Internet protocol (VoIP) and more specifically to a system and method of terminating a VoIP call. In certain exemplary embodiments, the present solution provides in a voice over Internet protocol (VoIP) network, a method of terminating a call received from a public switched telephone network (PSTN) phone by a session initiation protocol (SIP) phone via a PSTN gateway, in the absence of a terminating signal from the PSTN gateway, the method comprising: (a) receiving at said SIP phone a sequence of codec frames from said PSTN gateway; (b) determining if a specified portion of each codec frame in said received sequence of codec frames is a specified value; (c) if said specified portion is said specified value, incrementing a counter by an incrementing amount; and (d) when said counter reaches a specified threshold, terminating said call In the absence of a BYE message, session termination of a VoIP call can still be facilitated using the method and apparatus of the present invention.

26 Claims, 7 Drawing Sheets

U.S. PATENT DOCUMENTS

2007/0064681 A1* 3/2007 Boillot et al. ............... 370/352
2007/0274284 A1* 11/2007 Dendukuri et al. .......... 370/351

FOREIGN PATENT DOCUMENTS

| | | |
|---|---|---|
| EP | 0794650 | 12/2004 |
| WO | WO 00/17738 | 3/2000 |
| WO | WO 01/06367 | 1/2001 |
| WO | WO 01/17265 | 3/2001 |
| WO | WO 01/86633 | 11/2001 |
| WO | WO 03/044662 | 5/2003 |
| WO | WO 2004/057485 | 7/2004 |

* cited by examiner

| Symbol | Description | Bits |
|---|---|---|
| L0 | Switched moving average (MA) predictor of line spectrum pair (LSP) quantizer | 1 |
| L1 | First stage vector of quantizer | 7 |
| L2 | Second stage lower vector of LSP quantizer | 5 |
| L3 | Second stage higher vector of LSP quantizer | 5 |
| P1 | Pitch delay 1st subframe | 8 |
| P0 | Parity bit for pitch delay | 1 |
| C1 | Fixed codebook 1st subframe | 13 |
| S1 | Signs of fixed-codebook pulses 1st subframe | 4 |
| GA1 | Gain codebook (stage 1) 1st subframe | 3 |
| GB1 | Gain codebook (stage 2) 1st subframe | 4 |
| P2 | Pitch delay 2nd subframe | 5 |
| C2 | Fixed codebook 2nd subframe | 13 |
| S2 | Signs of fixed-codebook pulses 2nd subframe | 4 |
| GA2 | Gain codebook (stage 1) 2nd subframe | 3 |
| GB2 | Gain codebook (stage 2) 2nd subframe | 4 |

DEVICE FOR AND METHOD OF TERMINATING A VOIP CALL

BACKGROUND OF THE INVENTION

1. Technical Field

The invention relates to the field of voice over Internet protocol (VoIP) and more specifically to a system and method of terminating a VoIP call.

2. Description of the Related Prior Art

The growth and popularity of the Internet has facilitated voice over Internet Protocol (VoIP), the technology used to transmit voice traffic over a data network using the Internet Protocol. Such a data network may be the Internet or a corporate Intranet. Using the hardware/software integral to VoIP, users are able to use the data network as the transmission medium for telephone calls. Voice traffic is sent in IP packets rather than by traditional public switched telephone network (PSTN) circuits.

Figure 1:
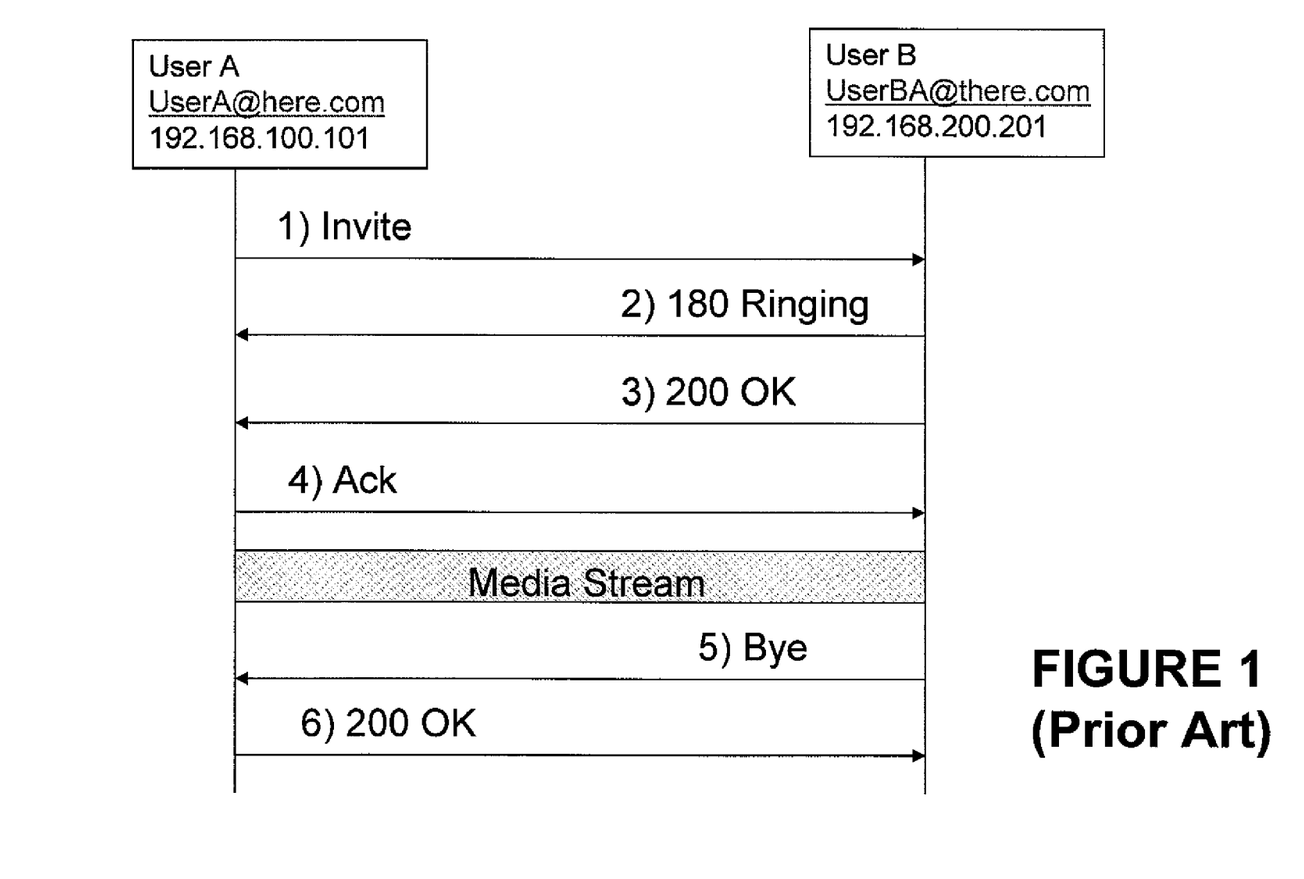
FIG. 1 a signal flow diagram depicting a typical call using SIP.

To connect an originating VoIP device with a destination VoIP device, an auxiliary IP-based protocol developed by the IETF known as Session Initiation Protocol (SIP) may be used. SIP is an application-layer control protocol that can establish, modify, and terminate multimedia sessions or calls with one or more participants. These multimedia sessions include, for example Internet telephony, and similar applications. FIG. 1 is a signal flow diagram depicting a typical call using SIP. At step 1) User A sends an INVITE to User B requesting session setup (i.e. for User B to participate in a media session). At step 2) User B responds with an informational message indicating that the SIP phone is ringing. At step 3) User B responds with an OK indicating that the User A request was successful. At step 4) User A sends an ACK request to confirm final response to the INVITE request. Following step 4) the media session occurs (e.g. the telephone conversation between User A and User B). At step 5) User B requests session termination by sending a BYE request. At step 6) User A responds with OK indicating the session has been successfully terminated.

In some cases, User B may be unable to request session termination because User B is unable to generate a BYE message. If this situation occurs, an alternate means of terminating the session is required.

SUMMARY OF THE INVENTION

The present solution serves to overcome the deficiencies of the prior art by providing an apparatus for and method of terminating a VoIP call in the absence of a terminating signal.

In certain exemplary embodiments, the present solution provides in a voice over Internet protocol (VoIP) network, a method of terminating a call received from a public switched telephone network (PSTN) phone by a session initiation protocol (SIP) phone via a PSTN gateway, in the absence of a terminating signal from the PSTN gateway, the method comprising: (a) receiving at the SIP phone a sequence of codec frames from the PSTN gateway; (b) determining if a specified portion of each codec frame in the received sequence of codec frames is a specified value; (c) if the specified portion is the specified value, incrementing a counter by an incrementing amount; and (d) when the counter reaches a specified threshold, terminating the call. Preferably, if the call is a voicemail message, the method further comprises after said step (d): trimming said voicemail message Certain other exemplary embodiments comprise a computer readable medium having stored thereon, computer-executable instructions which, when executed by a processor in a SIP phone cause the SIP phone to implement the method described above.

Still certain other exemplary embodiments comprise a carrier wave embodying a computer data signal representing sequences of statements and instructions which, when executed by a processor in a session initiation protocol (SIP) phone, cause the SIP phone to implement the method described above.

Yet another exemplary embodiment comprises a session initiation protocol (SIP) phone for terminating a call received from a public switched telephone network (PSTN) phone by said SIP phone via a PSTN gateway, in the absence of a terminating signal from the PSTN gateway, the SIP phone comprising: (a) a processor; (b) a codec communicating with the processor for compressing and decompressing a sequence of codec frames received from said PSTN gateway according to a specified standard; (c) a frame analyzer and counter communicating with the codec; and (d) a memory communicating with the processor and having stored thereon, computer-executable instructions which, when executed by the processor cause said SIP phone to: (i) receive the sequence of codec frames into the frame analyzer; (ii) determine if a specified portion of each codec frame in said received sequence of codec frames is a specified value; (iii) if the specified portion is the specified value, incrementing the counter by an incrementing amount; and (iv) when the counter reaches a specified threshold, terminating the call.

Still another exemplary embodiment comprises, in a voice over Internet protocol (VoIP) network, a method of terminating a voicemail message received from a public switched telephone network (PSTN) phone by a session initiation protocol (SIP) phone via a PSTN gateway, the method comprising: (a) receiving a sequence of codec frames from the PSTN gateway; (b) determining if a specified portion of each codec frame in the received sequence of codec frames is a specified value; (c) if the specified portion is the specified value, incrementing a counter by an incrementing amount; and (d) when a BYE message is received from the PSTN gateway: (i) terminating the call; and (ii) deleting a time associated with the incrementing from the voicemail message.

The advantage of the present solution is now readily apparent. In the absence of a BYE message, session termination of a VoIP call can still be facilitated using the method and apparatus of the present solution.

BRIEF DESCRIPTION OF THE DRAWINGS

Embodiments of the solution will now be described by way of example with reference to the accompanying drawings in which.

DESCRIPTION OF THE PREFERRED EMBODIMENT

Figure 2:
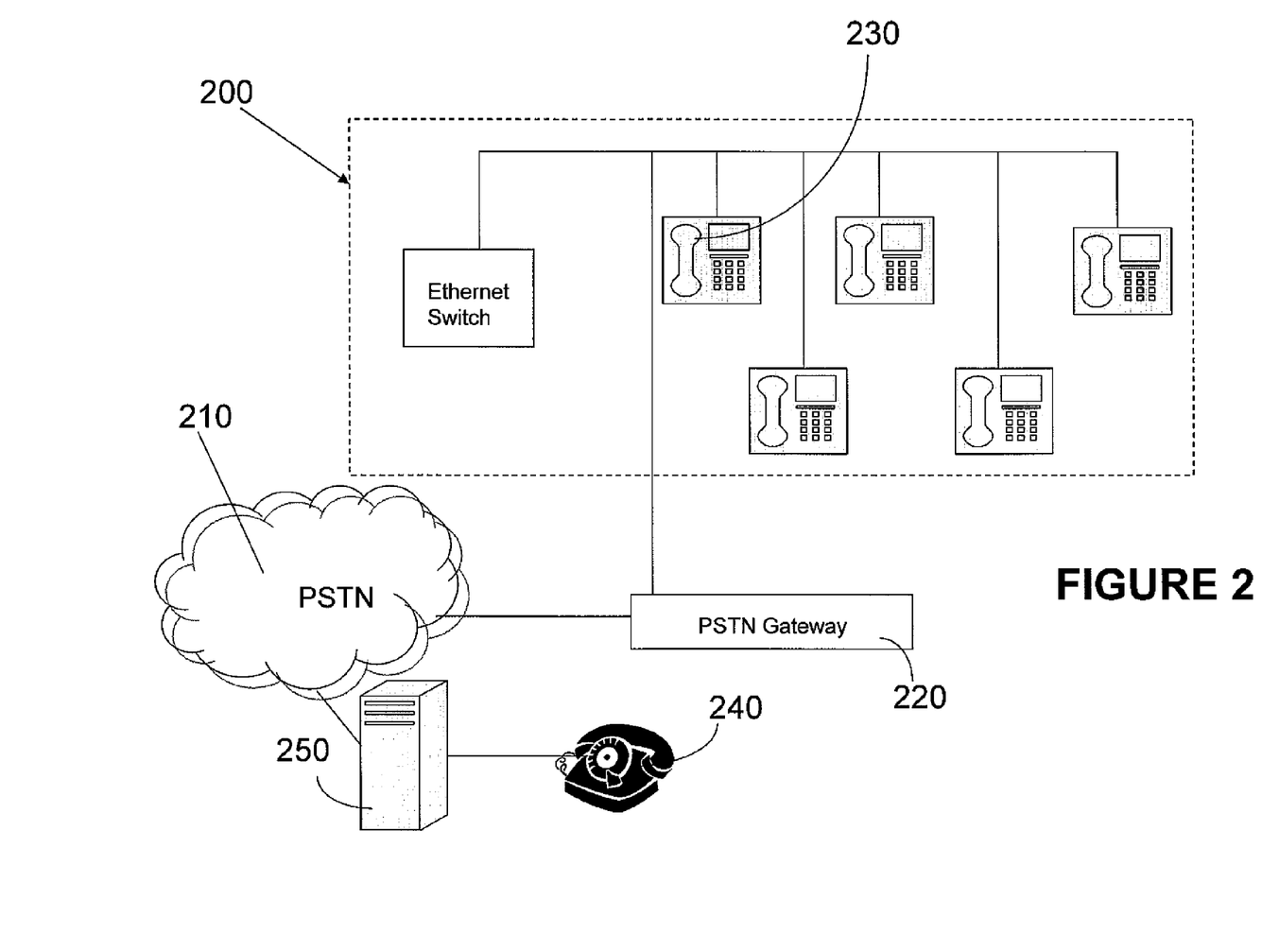
FIG. 2 depicts a sample Voice over IP over Ethernet network.

FIG. 2 depicts a particular network topology which facilitates VoIP and which incorporates an Enterprise (i.e. corporate) local area network (LAN) 200 connecting to a traditional public switched telephone network (PSTN) 210 via gateway 220. PSTN 210 accesses PSTN phone 240 via private branch exchange (PBX) 250. LAN 200 may be an Ethernet or packet based transmission protocol LAN. Ethernet is the common name for the Institute of Electrical and Electronics Engineers (IEEE) 802.3 industry specification and it is often characterized by its data transmission rate and type of transmission medium (e.g., 100 baseT or 100 Mbps over twisted pair). Distributed throughout LAN 200 are Internet telephones 230, which contain embedded software that allows them to initiate and receive calls through the Internet using standard protocols such as H.323 or SIP (discussed above). Internet telephones 230 in LAN 200 may utilize SIP-based peer-to-peer (P2P) technology whereby all Internet telephones 230 communicate directly with each other and join together dynamically to participate in call routing, call handling and other network-related processes that would otherwise be handled by a central server. Using P2P technology means that there is no traditional SIP infrastructure i.e. a SIP proxy or registration server normally associated with a SIP capable network are not required. In the network of FIG. 2, PSTN gateway 220 provides SIP to Signaling System Seven (SS7) conversion for accessing PSTN phone 240.

In a SIP-based telephony network, users place calls via entities known as user agent clients (UACs), an application which initiates a SIP request. Users receive calls via user agent servers (UASs), an application which contacts the end-user when a SIP request is received. Also, a UAS returns a response on behalf of the user since the user may select to accept, reject, or redirect the request. Accordingly, a SIP "user agent" is identified by a particular combination of a UAC and its associated UAS. The basic protocol functionality and its operation are summarized as follows. Calling parties and called parties are identified by SIP addresses which point to "objects" on a network. The objects are "users at hosts," having appropriate SIP Universal Resource Locators (URLs) as addresses. The SIP URL typically takes a form similar to a mailto or telnet URL, i.e., user@host. The user part is generally provided as a user name or a telephone number. The host part typically comprises a domain name having a Domain Name System (DNS) Server Name, CNAME, or a numeric network address, among others.

In the network of FIG. 2, PSTN gateway 220 acts as a user agent for calls between a PSTN phone 240 and a selected Internet phone 230 contained in LAN 200. Depending on the sophistication of PSTN gateway 220, it may not be able to provide the full functionality of Internet phone 230. More specifically, it may be unable to generate a BYE message to request termination of the media session. Where a PSTN caller has encountered an auto attendant or the like associated with Internet phone 230 and terminates the call, valuable network resources may be wasted before the auto attendant determines that the call has ended. This problem is heightened if a PSTN caller is attempting to leave a voice message on Internet phone 230. If the session is not properly terminated, Internet phone 230 will continue to record a message with no content up to the default storage space allotted to a received voice message, thereby unnecessarily utilizing memory of Internet phone 230, in addition to wasting network resources.

Figure 3:
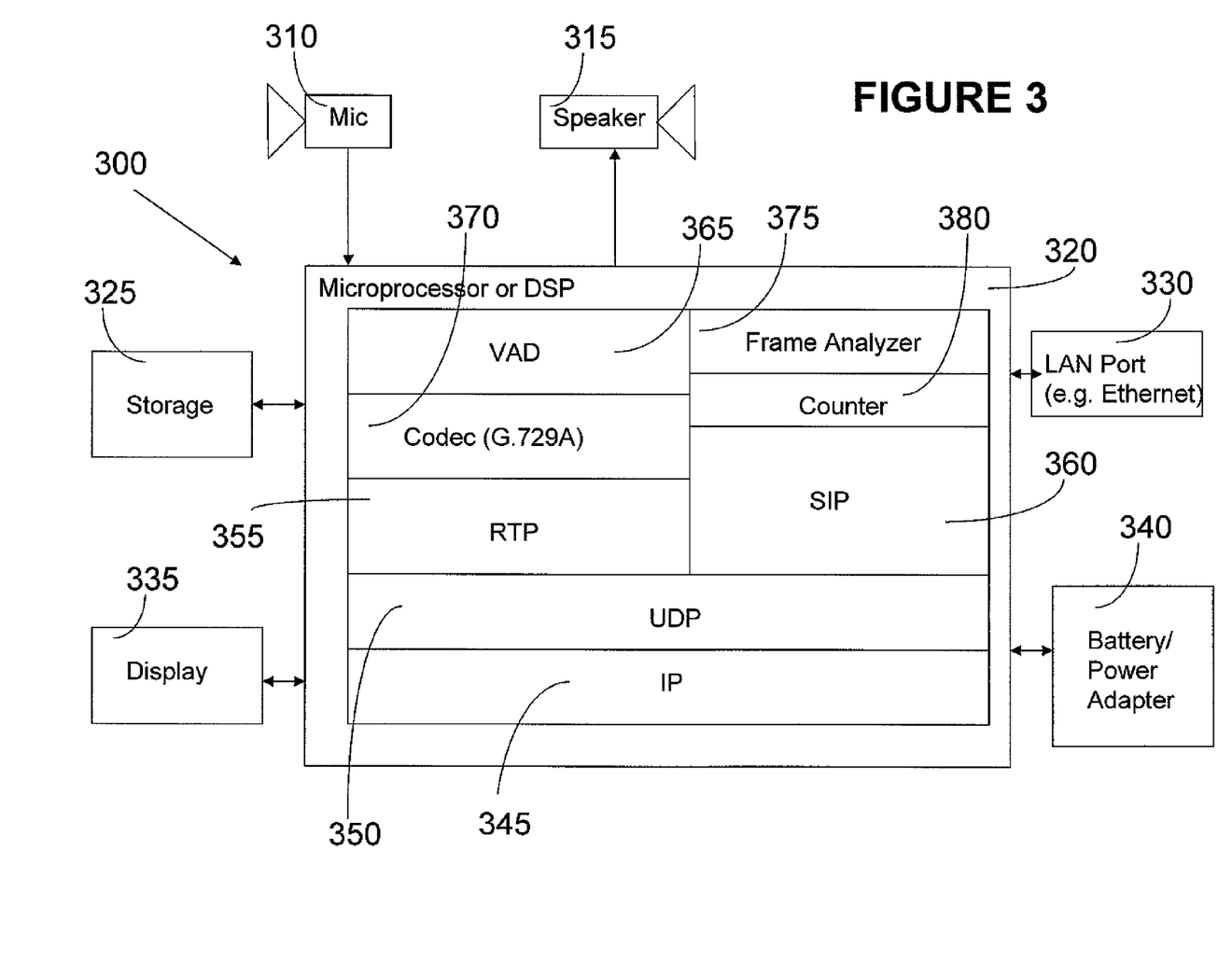
FIG. 3 is a block diagram of a typical VoIP phone.

FIG. 3 is a block diagram of a typical SIP VoIP phone 300, a specific example of the Internet phone 230 shown in FIG. 2. FIG. 3 does not illustrate all functional elements of SIP phone 300 for simplicity. SIP phone 300 consists of a microphone 310 and speaker 315 through which a user speaks and listens to a caller respectively. Communicating with microphone 310 and speaker 315 is microprocessor or digital signal processor (DSP) 320 which includes various software modules which will be discussed below. Connected to DSP 320 is storage media 325 for storing, among other things, voice messages received from a caller and/or processor executable instructions for performing the method of the present invention. Also connected to DSP 320 is LAN port 330 for providing access to LAN 200 described in relation to FIG. 2. Finally, SIP phone 300 also includes display 335 which serves as a user interface, and battery/power adapter 340 for powering the aforementioned parts of SIP phone 300.

DSP 320 includes a number of modules which define the protocols used to communicate in the VoIP network of FIG. 2. These include but are not limited to: (a) Internet Protocol (IP) module 345; (b) User Datagram Protocol (UDP) module 350; (c) Real-time Transport Protocol (RTP) module 355, and SIP module 360. DSP 320 further includes voice activity detection (VAD) module 365 which, when enabled on a voice port or a dial peer, causes SIP phone 300 to not transmit silence over the network, only audible speech. Additionally, DSP 320 comprises a codec 370, frame analyzer 375 and counter 380 the operation of which will be described in relation to FIGS. 4 and 7. As will be appreciated by those in the art, such functions as jitter control, echo cancellation (in accordance with e.g. ITU standard G.165/168) and logical link control (in accordance with e.g. LAN standard IEEE 802.2) are also performed by DSP 320 and are meant to be included in the functionality of SIP phone 300.

Figure 4:
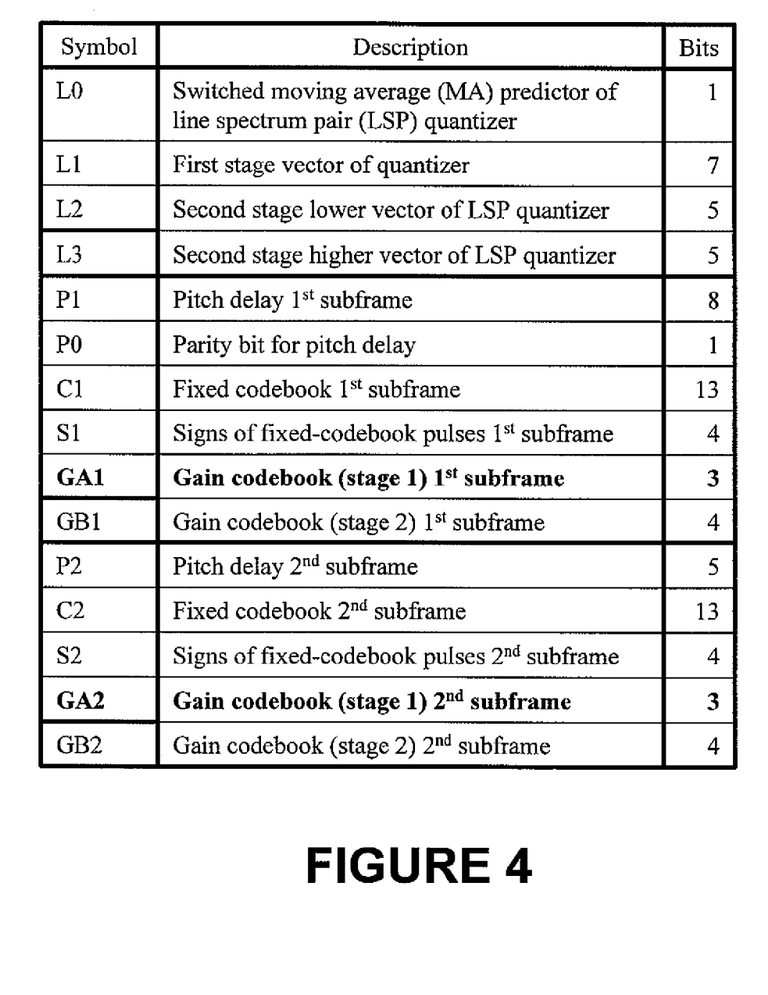
FIG. 4 is a table which details the elements of a G.729A codec frame.

As will be appreciated by those in the art, in the telecommunications environment, a codec, such as codec 370, is a piece of hardware/software that converts an analog voice signal to a digitally encoded version. More specifically, in VoIP networks, the codec samples the audio waveform at regular intervals and generates a value for each sample. These samples are typically taken at 8000 Hz. These individual values are accumulated for a fixed period to create a frame of data. Each service, program, phone, gateway, etc. typically supports several different codecs, and when talking to each other, negotiate which codec they will use. SIP phone 300 of the present solution supports the International Telecommunications Standard (ITU) G.729A standard, although the present solution is not meant to be limited in this regard. G.729A is a reduced complexity 8 kbit/s conjugate-structure algebraic-code-excited linear prediction (CS-ACELP) codec. With the G.729A standard the sampling occurs over 10 milliseconds (ms) and produces a very small frame of data (i.e. 10 bytes). FIG. 4 is a table which details the 80 bit G.729A codec frame and its component parts. Integral to the present invention are sub-frames GA1 and GA2 which will be discussed in relation to FIG. 7.

Figure 5:
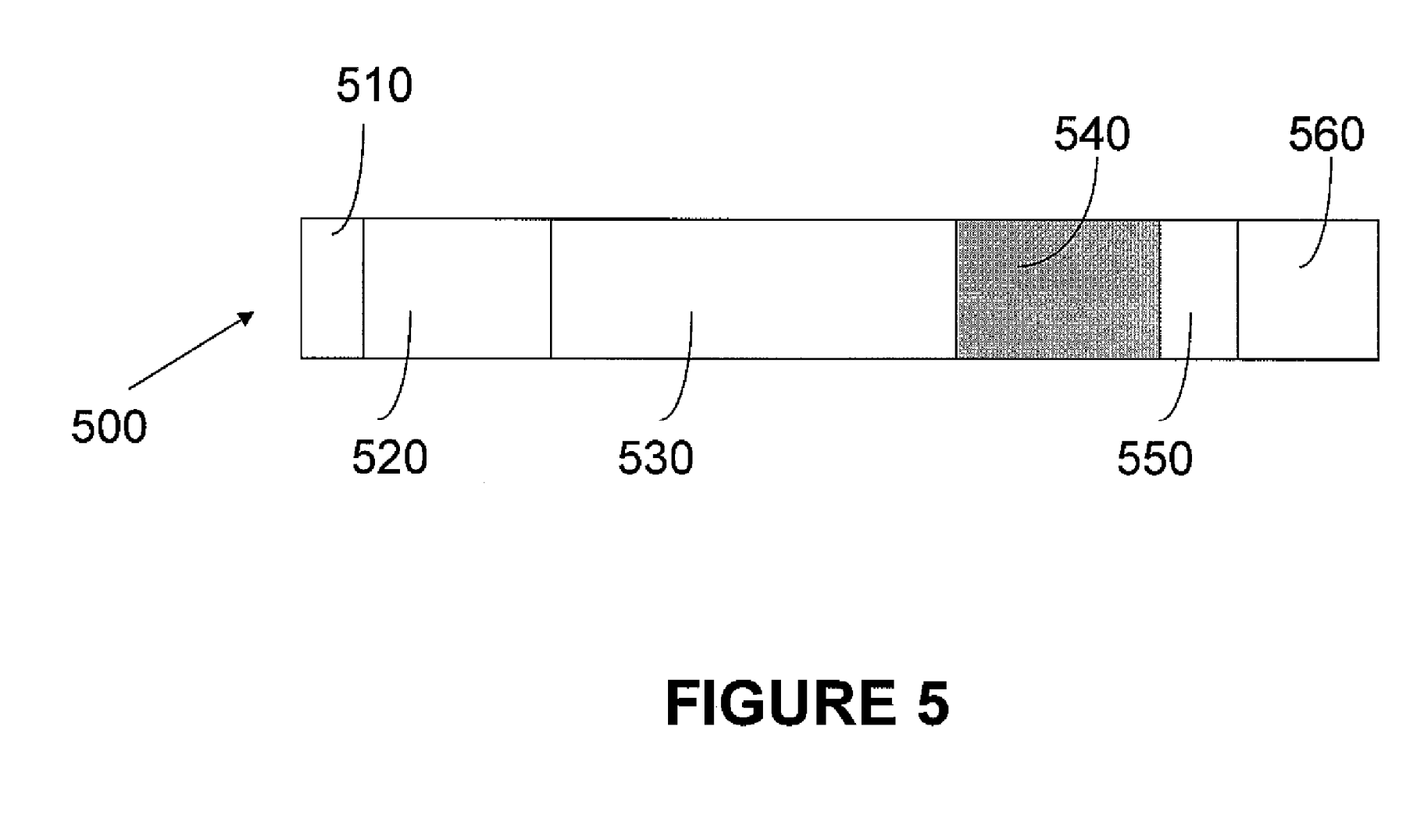
FIG. 5 depicts a sample voice over IP over Ethernet packet containing the G.729A codec frame of FIG. 4.

As those in the art will also appreciate, the payload (or data frame) generated by the codec is wrapped in an IP header to form an IP packet which is the vehicle used to deliver the payload to its destination. These layers are: IP; UDP; and RTP. In the case of G.729A, to increase the efficiency of the VoIP network, two frames of data are placed in each IP packet (or 20 ms worth of sampling). In order to travel through the IP network, the IP packet is wrapped in another layer by the physical transmission medium e.g. Ethernet. FIG. 5 depicts a sample voice over IP over Ethernet package 500 comprising an Ethernet preamble 510, Ethernet header 520, IP header 530, payload 540 containing the two G.729A codec frames, Ethernet cyclical redundancy check (CRC) 550 and Ethernet Inter-Frame gap 560.

Figure 6:
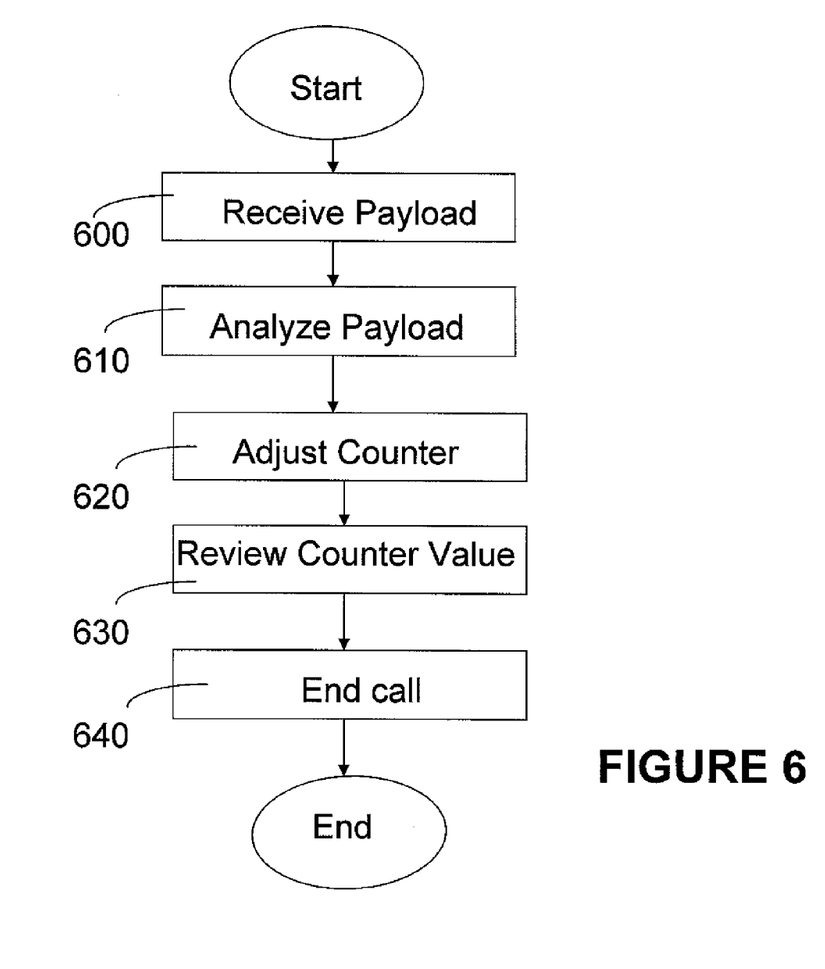
FIG. 6 is a flow chart broadly depicting the steps of the present solution.

FIG. 6 is a flow chart broadly depicting the steps for terminating a call in accordance with the present invention. At step 600, payload 540 contained in Ethernet package 500 is received by SIP phone 300. At step 610, the payload is analyzed to determine the presence or absence of a specified value. Based on the analysis, a counter is adjusted at step 620. The counter value is then reviewed at step 630 to determine if it has reached a specified threshold. If it has reached the specified threshold then the call is terminated at step 640. It should be understood that the payloads are analyzed in sequence as they are received from PSTN gateway 220 and that the each received payload continues to be analyzed until the specified threshold is met.

Figure 7:
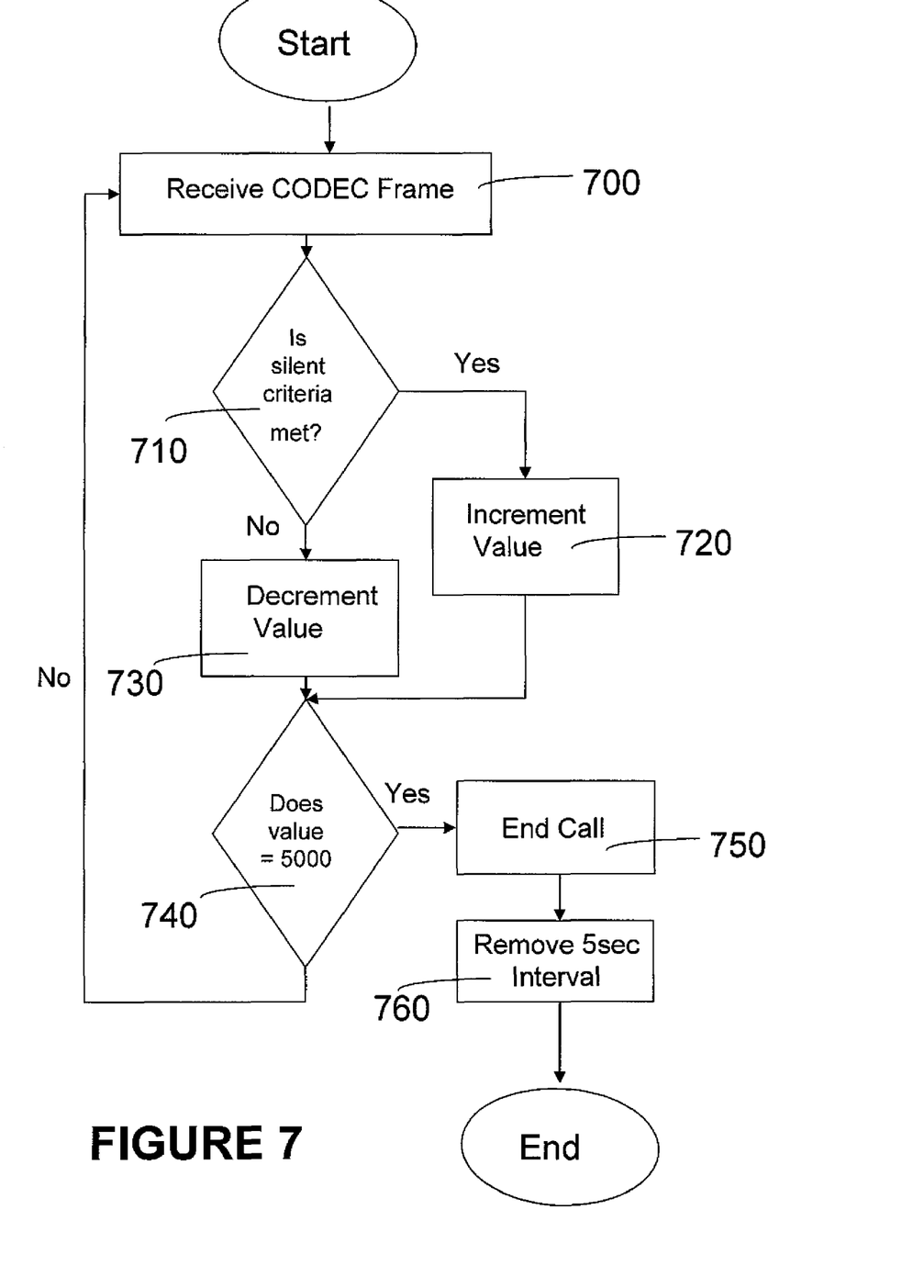
FIG. 7 is a flow chart depicting in greater detail the steps of the present solution.

FIG. 7 is a flow chart depicting in greater detail the steps of the present invention. The VAD described in relation to FIG. 3 is turned off so that every received IP packet is a straight G.729A codec frame i.e. the present invention looks for silent codec frames to determine if call termination is appropriate. At step 700, a G.729A codec frame is received at SIP phone 300. More specifically, each of the two G.729A codec frames are extracted from each sequentially received Ethernet package 500 and individually analyzed. At step 710 the GA1 and GA2 sub-frames of a received G.729A codec frame (see FIG. 4) are analyzed by frame analyzer 375 to determine if they contain a value of 1 or 5. These values are indicative of silence (i.e. no audio received from PSTN gateway 220). If GA1 is 1 or 5 and GA2 is 1 or 5 then, at step 720, counter 380 is incremented by an amount (L) where L=10. If GA1 is not 1 or 5 or GA2 is not 1 or 5 then, at step 730, counter 380 is decremented by an amount 3 L or 30. It should be understood that counter 380 will not be decremented below zero. Counter 380 will simply remain at zero until a "silent" frame is received. Next at step 740, the value of counter 380 is reviewed. If the value is less than 5000 then the next G.729A codec frame is received at step 700 and the method outlined above is repeated. If the value is greater than or equal to 5000 then, at step 750, the call is terminated. In the event that the call is a voice message then optionally, at step 760, the portion of the voice message represented by the value of counter 380 is deleted. More specifically, the counter value can be interpreted as a count of silent frames that can be discarded. Since each G.729A codec frame is 10 milliseconds in length, a counter value of 5000 would be equivalent to:

5000÷10=500 frames 500 frames×10 milliseconds/frame=5000 milliseconds or 5 seconds The present invention has been described in relation to a SIP call where a termination signal is not generated by PSTN gateway 220. It should be understood that the invention may also be used between SIP phones 300 or PSTN phone 240 and SIP phone 300 where a BYE signal is present but delayed. For example, if a caller has left a voice message, there may be several seconds between the time that the caller ends the call (e.g. places the handset "on hook") and the BYE message is generated. The present invention can alternately be used to trim the delay from the voice message for the purpose of preserving memory in SIP phone 300. In this case, whatever time is associated with the counter value is deleted from the voice message e.g. a counter value of 3000 would be equivalent to 3 seconds.

Although particular embodiments of the present invention have been described in detail, it should be appreciated that numerous variations, modifications and adaptations may be made without departing from the scope of the invention as defined in the appended claim set. For example, although the preferred embodiment has been described in relation to codec G.729A, it will be understood that invention could be practiced using other codecs such as G.711. In addition, although the preferred embodiment has been described in relation to a plurality of SIP phones using P2P technology, a network in which the SIP phones communicate via a proxy server could also be used to implement the present invention.

I claim:

1. In a voice over Internet protocol (VoIP) network, a method of terminating a call received from a public switched telephone network (PSTN) phone by a session initiation protocol (SIP) phone via a PSTN gateway, in the absence of a terminating signal from said PSTN gateway, said method comprising:
 (a) receiving at said SIP phone a sequence of codec frames from said PSTN gateway;
 (b) determining a value of a specified portion of each codec frame in said received sequence of codec frames;
 (c) if said determined value is a specified value within a predetermined set of integer values, incrementing a counter by an incrementing amount; and
 (d) when said counter reaches a specified threshold, terminating said call.

2. The method of claim 1 further comprising after said step (c):
 if said determined value is not said specified value, decrementing said counter by a decrementing amount.

3. The method of claim 2, wherein if said call is a voicemail message, said method further comprising after said step (d):
 trimming said voicemail message.

4. The method of claim 3 wherein said incrementing amount is +10.

5. The method of claim 3 wherein said decrementing amount is −30.

6. The method of claim 3 wherein said specified threshold is 5000.

7. The method of claim 3 wherein each codec frame in said received sequence of codec frames is a G.729A codec frame.

8. The method of claim 7 wherein said specified portion of each G.729A codec frame comprises sub-frames GA1 and GA2.

9. The method of claim 8 wherein said specified value of said specified portion is 1 or 5.

10. The method of claim 9 wherein said step of trimming said voicemail message comprises deleting a time associated with said incrementing from said voicemail message.

11. A non-transitory computer readable medium having stored thereon, computer-executable instructions which, when executed by a processor in a session initiation protocol (SIP) phone cause said SIP phone to implement the method of claim 1.

12. A session initiation protocol (SIP) phone for terminating a call received from a public switched telephone network (PSTN) phone by said SIP phone via a PSTN gateway, in the absence of a terminating signal from said PSTN gateway, the SIP phone comprising:
 (a) a processor;
 (b) a codec communicating with said processor for compressing and decompressing a sequence of codec frames received from said PSTN gateway according to a specified standard;
 (c) a frame analyzer and counter communicating with said codec; and
 (d) a memory communicating with said processor and having stored thereon, computer-executable instructions which, when executed by said processor cause said SIP phone to:
  (i) receive said sequence of codec frames into said frame analyzer;

(ii) determine a value of a specified portion of each codec frame in said received sequence of codec frames;

(iii) if said value equals a specified value within a predetermined set of integer values, incrementing said counter by an incrementing amount; and (iv) when said counter reaches a specified threshold, terminating said call.

13. The SIP phone of claim 12 wherein said SIP phone is one of a plurality of SIP phones within a local area network (LAN), and wherein said LAN communicates with said PSTN gateway.

14. The SIP phone of claim 13 wherein said LAN is an Ethernet LAN and wherein said plurality of SIP phones utilize SIP-based peer-to-peer (P2P) technology.

15. The SIP phone of claim 12 wherein said specified standard is G.729A.

16. The SIP phone of claim 12 wherein each codec frame in said received sequence of codec frames is a G.729A codec frame, and wherein said specified portion of each G.729A codec frame comprises sub-frames GA1 and GA2.

17. The SIP phone of claim 12 wherein said processor is taken from the group comprising a microprocessor and a digital signal processor.

18. In a voice over Internet protocol (VoIP) network, a method of terminating a voicemail message received from a public switched telephone network (PSTN) phone by a session initiation protocol (SIP) phone via a PSTN gateway, said method comprising:

(a) receiving at said SIP phone a sequence of codec frames from said PSTN gateway;

(b) determining if a specified portion of each codec frame in said received sequence of codec frames is a specified value within a predetermined set of integer values;

(c) if said specified portion is said specified value, incrementing a counter by an incrementing amount; and (d) when a BYE message is received from said PSTN gateway:

(i) terminating said call; and (ii) permanently deleting a time associated with said incrementing from said voicemail message.

19. The method of claim 18 further comprising after said step (c):

if said specified portion is not said specified value, decrementing a counter by a second amount.

20. The method of claim 19 wherein each codec frame in said received sequence of codec frames is a G.729A codec frame, and wherein said specified portion of each G.729A codec frame comprises sub-frames GA1 and GA2.

21. In a voice over Internet protocol (VoIP) network, a method of terminating a call received from a public switched telephone network (PSTN) phone by a session initiation protocol (SIP) phone via a PSTN gateway, in the absence of a terminating signal from said PSTN gateway, said method comprising:

(a) receiving at said SIP phone a sequence of codec frames from said PSTN gateway;

(b) determining if a specified portion of each codec frame in said received sequence of codec frames is a specified value within a predetermined set of integer values;

(c) if said specified portion is said specified value, incrementing a counter by a predetermined incrementing amount;

(d) if said specified portion is not said specified value, decrementing said counter by a predetermined decrementing amount; and (e) when said counter reaches a specified threshold, terminating said call.

22. The method of claim 21 wherein if said call is a voicemail message, said method further comprising deleting an end portion of said message.

23. The method of claim 1, wherein determining a value of a specified portion of each codec frame comprises analyzing a first portion of a first subframe of each codec frame to determine whether the first portion contains the specified value and analyzing a second portion of the first subframe of each codec frame to determine whether the second portion contains the specified value.

24. In a voice over Internet protocol (VoIP) network, a method of terminating a call received from a public switched telephone network (PSTN) phone by a session initiation protocol (SIP) phone via a PSTN gateway, in the absence of a terminating signal from said PSTN gateway, said method comprising:

receiving at said SIP phone from said PSTN gateway a packet having a header and containing a first codec frame;

analyzing said first codec frame to determine a first value contained in a first portion of said first codec frame;

comparing said first value to a predetermined set of integer values to determine whether said first value is a member of said predetermined set of integer values;

if said first value is a member of said predetermined set of integer values, incrementing a counter by an incrementing amount;

if said first value is not a member of said predetermined set of integer values, not incrementing the counter; and when said counter reaches a specified threshold, terminating said call.

25. The method of claim 24 further including analyzing said first codec frame to determine a second value contained in a second portion of said first codec frame;

comparing said second value to the predetermined set of integer values to determine whether said second value is a member of said predetermined set of integer values; and if said second value is not a member of said predetermined set of integer values, decrementing said counter.

26. The method of claim 25, wherein said packet includes a second codec frame and further including analyzing said second codec frame to determine a third value contained in a first portion of said second codec frame and comparing said third value to the predetermined set of integer values to determine whether said third value is a member of said predetermined set of integer values.

* * * * *